United States Patent
Hamada et al.

(10) Patent No.: US 8,600,637 B2
(45) Date of Patent: Dec. 3, 2013

(54) VEHICLE BRAKING CONTROL DEVICE FOR BRAKING FORCE DISTRIBUTION

(75) Inventors: Chiaki Hamada, Mishima (JP); Akifumi Doura, Obu (JP)

(73) Assignee: Advics Co., Ltd., Kariya-Shi (JP)

( * ) Notice: Subject to any disclaimer, the term of this patent is extended or adjusted under 35 U.S.C. 154(b) by 1623 days.

(21) Appl. No.: 10/815,765

(22) Filed: Apr. 2, 2004

(65) Prior Publication Data

US 2004/0260446 A1  Dec. 23, 2004

(30) Foreign Application Priority Data

Apr. 7, 2003  (JP) .................................. 2003-103127

(51) Int. Cl.
*G06F 19/00*  (2011.01)
*B60T 8/32*  (2006.01)

(52) U.S. Cl.
USPC .............. 701/70; 313/113; 313/115; 180/197

(58) Field of Classification Search
USPC ......... 701/69–71; 303/113.14, 146, 139, 137, 303/113.1, 113.4, 113, 115; 477/83; 180/197
See application file for complete search history.

(56) References Cited

U.S. PATENT DOCUMENTS

| | | | |
|---|---|---|---|
| 5,826,954 A | 10/1998 | Schmitt et al. | |
| 6,474,751 B1 | 11/2002 | Yamaguchi et al. | |
| 6,505,893 B2 * | 1/2003 | Schmidt et al. | 303/122.09 |
| 6,913,326 B1 * | 7/2005 | Ohkubo et al. | 303/11 |
| 6,957,874 B2 * | 10/2005 | Hara et al. | 303/152 |
| 2001/0054843 A1 * | 12/2001 | Schmidt et al. | 303/122.13 |
| 2002/0008423 A1 * | 1/2002 | Yasui et al. | 303/9.62 |
| 2002/0014799 A1 * | 2/2002 | Nagae | 303/139 |
| 2002/0024252 A1 * | 2/2002 | Banno et al. | 303/113.1 |
| 2002/0043874 A1 * | 4/2002 | Nishio et al. | 303/114.1 |
| 2002/0185913 A1 * | 12/2002 | Watanabe | 303/139 |
| 2003/0052536 A1 * | 3/2003 | Schneider et al. | 303/146 |

FOREIGN PATENT DOCUMENTS

| | | |
|---|---|---|
| DE | 195 18 206 A1 | 11/1996 |
| EP | 1 104 731 A2 | 6/2001 |
| JP | A 5-213169 | 8/1993 |
| JP | A-09-136627 | 5/1997 |
| JP | A-2000-16259 | 1/2000 |
| JP | A 2001-219834 | 8/2001 |
| JP | A 2001-247025 | 9/2001 |
| JP | A-2002-2466 | 1/2002 |
| JP | A 2003-160039 | 6/2003 |

* cited by examiner

*Primary Examiner* — Ronnie Mancho
(74) *Attorney, Agent, or Firm* — Oliff & Berridge, PLC

(57) ABSTRACT

A braking control device for a vehicle executes braking force distribution (BFD) biased to front wheel in a manner compatible with Anti-skid control. In BFD control, braking force on rear wheels is held at a holding braking force and braking force on the front wheels is incremented beyond braking force requested by a braking action of a driver. After the starting of BFD control, further increase in the braking action is reflected in the front wheel braking force. Upon starting anti-skid control for either of the wheels during the execution of BFD control, an increment of the front wheel braking forces to be requested by BFD control is gradually decreased. Simultaneously, the holding of the rear braking force is released so as to compensate for the shortage of braking force on the front wheel. The gradual decrease of the braking force increment prevents a conflict of BFD and Anti-skid control.

13 Claims, 5 Drawing Sheets

VEHICLE BRAKING CONTROL DEVICE FOR BRAKING FORCE DISTRIBUTION

BACKGROUND OF THE INVENTION

1. Field of the Invention

The present invention relates to a device for controlling brakes of a vehicle such as an automobile, and more specifically, to such a device that controls braking force distribution among front and rear wheels in a vehicle.

2. Description of Prior Art

During braking of a vehicle, a rear wheel is liable to be locked because its frictional circle is shrunk due to the forward shifting of the load of the vehicle. The locking of a rear wheel, prior to a front wheel, induces serious deterioration of a vehicle running behavior, such as disturbance in the attitude and/or spinning of a vehicle body. In order to avoid the locking of a rear wheel, braking force distribution (BFD) control has been proposed to keep braking force on rear wheels lower than on the front wheels. In such BFD control, braking pressures applied to rear wheel cylinders in a hydraulic braking system is held, reduced or pulsatively increased, i.e. the increase in braking force generated on rear wheels is restricted, providing a distribution of braking force biased to front wheels. Usually, BFD control, often referred to as "Electronic Braking force Distribution Control (EBD control)", is executed by a computerized device operating a plurality of solenoid valves in a hydraulic circuit. Examples of devices executing EBD control are seen in Japanese Laid-Open Patent Publications (JP) Nos. 5-213169 and 2001-219834.

Under EBD control, a demand from a driver of a vehicle for increasing braking force (e.g. a depression of a brake pedal) is modified for the restriction of braking force on rear wheels, which would cause the reduction of the total braking force. Thus, the driver would feel that the actually generated braking force is incompatible with his braking operation. In order to eliminate this feeling of the incompatibleness while maintaining the braking performance and behavior of a vehicle, JP No. 2001-219834 discloses an EBD control device, in which, after once restricted, braking force on rear wheels is pulsatively increased in response to the increase of a braking action by a driver under a certain running condition. For preventing the locking of rear wheels, however, braking force on the rear wheels could not be increased limitlessly.

Accordingly, it is preferable that, in BFD control device, total braking force on a vehicle body may be rendered as close to the amount requested by a driver of the vehicle as possible, without inducing the locking of the rear wheels and the instability in the vehicle attitude induced therefrom.

By the way, even during execution of BFD control, Anti-skid (ABS) control is to be executed if either of wheels is being locked (Because of BFD biased to front wheels, usually, a front wheel is more liable to be locked than a rear wheel.). During ABS control, decreasing and increasing braking pressure for a wheel to be controlled is repeated to adjust the slip ratio of the wheel, and thereby the slipping or locking of the wheel is prevented. Since a condition requiring ABS control is to be controlled urgently, ABS control will operate a hydraulic circuit of a brake system to change wheel cylinder pressures while ignoring the setting of the pressure by BFD control. Further, when the front wheel is under ABS control, the rear wheel braking pressure is often increased for compensating for the restriction of the front wheel braking force and obtaining total braking force on a vehicle. In such a case, namely, when BFD and ABS controls are executed subsequently and/or alternatively, the condition in the hydraulic circuit is liable to be out of control of a driver, causing deterioration of the braking controllability of the vehicle.

Accordingly, a BFD control device should be improved in order to render it compatible with ABS control without deteriorating the controllability of the vehicle as well as the advantages of both BFD and ABS controls.

SUMMARY OF INVENTION

According to the present invention, there is provided a novel braking control device for a vehicle executing BFD control compatible with ABS control. A vehicle equipped with the control device has front and rear wheels, a braking system including braking force generating apparatuses provided for the respective wheels; at least a sensor monitoring an operational condition of the vehicle including a detector detecting an amount of braking action by a driver of the vehicle. In response to a variation of the operational condition monitored by the sensor, the control device executes BFD control in which braking force on the rear wheels is lowered in comparison with that on front wheels while the braking force on the front wheels is increased based upon an increment of the braking action amount by the driver detected by the detector. Namely, further increase in the braking action after the starting of BFD control is reflected in the front wheel braking force. Upon starting anti-skid control for either of the wheels during the execution of BFD control, however, an increment of the front wheel braking forces to be requested by BFD control is decreased.

As described above, the restriction of rear wheel braking forces would render the total braking force on a vehicle body short. Thus, preferably, the inventive BFD control device not only restricts the increase of braking force on the rear wheels by holding the rear wheel cylinders at a holding pressure determined based upon vehicle's running conditions (e.g. by closing valves in the lines to the rear wheel cylinders), but also increases braking force on the front wheels for compensating the shortage of the rear wheel braking force and ensuring the generation of total force to be applied on a vehicle body. The increment of the front wheel pressure may be determined as a function of the restricted amount of the braking force on the rear wheels so as to render the resultant force increment on the front wheel equal to the force decrement on the rear wheels. Thus, the total braking force on the vehicle body can be rendered in conformity with the amount requested by a driver of the vehicle without the locking of the rear wheels and instability in the vehicle attitude induced therefrom.

Further, because of BFD control biased to front wheels, a front wheel is more liable to enter into the locked condition than a rear wheel. Thus, usually, ABS control starts for either of front wheels, first. Under such a condition, since no longer preferable is BFD biased to the front wheels, the increment of the front wheel braking force requested by BFD control will be reduced. Preferably, the process of reduction of the increment is executed gradually, avoiding abrupt variation of the front wheel braking force that would deteriorate the stability of the running condition of the vehicle; and excessive reduction of the deceleration of a vehicle which would render a driver anxious. Further, preferably, the reduction of the increment is executed irrespective of the braking action by the driver (the increment for the front wheel is determined based upon the driver's operation under a normal BFD control.).

The reduction of the increment for the front wheels is advantageous for avoiding conflict of BFD and ABS controls especially in a hydraulic braking system.

A hydraulic braking system, typically employed in a four-wheeled vehicle, has valves, provided for individual wheel cylinders, for adjusting the respective braking pressure; and at least a common hydraulic line for applying braking pressure from a pressure supply to the wheel cylinders. More specifically, such a braking system has dual circuits, the one for front wheels and the other for rear wheels (front and rear (F-R) dual circuits), or the one for front-left and rear-right wheels and the other for front-right and rear-left wheels (cross (X) dual circuits), each circuit having a common line, the pressure in which is controlled with a single valve. In those circuit systems, if one wheel in one circuit is under ABS control and the other still under BFD control, these controls will conflict with each other: the pressure variation in the common line affects on both the wheels through the repetition of opening and closing of the valves involved with ABS control.

Such a confliction of BFD and ABS controls is serious especially in X dual circuit system where a rear wheel cylinder and a front wheel cylinder are connected with a single common line.

Generally, when ABS control is started for a front wheel, valves of the rear wheels are opened for increasing their braking pressures in order to compensate for the shortage of the front wheel braking force (as described in Background of Invention). Under BFD control, however, the common line is highly pressurized for increasing the front wheel braking pressure in response to the braking action. So, if a valves for a rear wheel is opened, the highly pressurized braking fluid in the common line would rush into the corresponding rear wheel cylinder, and thereby the rear wheel cylinder is excessively pressurized, rendering the rear wheel braking force excessive abruptly, which induces the deterioration of the vehicle stability.

Moreover, in both types of F-R and X dual circuits, if the front wheel braking pressure is continuously increased in response to the braking action while the rear wheel braking pressure is also increased in response to starting of ABS control, the total braking force on a vehicle would be excessive in comparison with the braking force intended by the driver, and thus, the braking controllability of the vehicle is deteriorated.

In accordance with the present invention, the above-mentioned conflict of ABS and BFD controls and its undesirable results, occurring in hydraulic braking systems, are avoided by reducing the braking pressure for the front wheel, i.e. by smoothly fading out the effect of BFD control after starting of ABS control.

The reduction of the increment for the front wheel braking force requested through BFD control may be continued until the increment is reduced to 0 as long as ABS control continues. This reduction may be ceased together with the termination of ABS control: Then, BFD control will be normally executed because no longer conflict exists.

By the way, upon terminating BFD control, irrespective of its reason, the holding of the rear wheel braking force will be released, e.g. the valves for isolating rear wheel cylinders from the common line will be opened,. When BFD control is to be ceased due to abnormal reason, such as a failure of sensors or detectors, however, it is possible that the increment for the front wheel still has a significant value and the common line is still under highly pressurized, so that the opening of the valves would cause an abrupt variation of the braking force on the wheels. In order to avoid such an abrupt variation, it is preferable to reduce the increment for the front wheel. In this case, the rate of the reduction is preferably faster than the rate of reduction during execution of ABS control, because it is preferable to get rid of the effect of BFD control under such an abnormal condition as soon as possible.

In one embodiment of the present invention implemented in a hydraulic braking system, an increment in front wheel braking force, required through this control, may be estimated based upon a rear wheel braking pressure. In this regard, braking force generating apparatuses for the front and rear wheels, even supplied with operational fluid from a master cylinder at the same pressure, exhibit different braking performances, which decreases with the increase of a vehicle speed. Thus, in derivation of the increment to be added into the front wheel braking pressure for generating the required increment in the front wheel braking forces, an amount of a braking action by a driver of the vehicle and parameters indicating braking performances of braking force generating apparatuses of the front and rear wheels will be taken into account. Then, the precise and appropriate control of the front wheel braking force is allowed based upon pressures in a hydraulic circuit of a braking system. In this connection, for reflecting the vehicle-speed dependence of the performance of the braking force generating apparatus in the control, preferably, the braking performance indicated by the parameters should have the same vehicle-speed dependence of decreasing with the increase of a vehicle speed. For a parameter of such braking performances, useful is a vehicle speed-dependent, braking effectiveness factor of a front wheel upon a vehicle.

Further, preferably, the amount of rear wheel braking force to be decremented or the holding pressure may be determined based upon a vehicle speed, a deceleration and/or other vehicle running condition at the starting of BFD control.

Thus, it is an object of the present invention to provide new and novel devices for controlling a brake of a vehicle for executing braking force distribution among front and rear wheels of the vehicle, in which the braking force distribution control is executed in a manner compatible with Anti-skid control.

It is another object of the present invention to provide such devices in which, by reducing the effect of braking force distribution control, no conflict of braking force distribution and Anti-skid control occurs.

It is a further object of the present invention to provide such devices for a hydraulic braking system having dual circuits, wherein the increment in a front wheel braking pressure requested through BFD control is reduced during execution of Anti-skid control for either of wheels, preventing braking force on a vehicle from being excessive.

It is a further object of the present invention to provide such devices for X dual circuit braking system, wherein, by reducing the front wheel braking pressure during execution of Anti-skid control, rushing of highly pressurized braking fluid into rear wheel cylinders is prevented.

It is another object of the present invention to provide such devices wherein a control mode is switched into another smoothly, thereby avoiding abrupt change of braking force on a vehicle, a shortage of total braking force on a vehicle, and deterioration of braking controllability of a driver due to Anti-skid control.

Other objects and advantages of the present invention will be in part apparent and in part pointed out hereinafter.

BRIEF DESCRIPTION OF THE DRAWINGS

In the accompanying drawings.

DESCRIPTION OF PREFERRED EMBODIMENTS

Figure 1A:
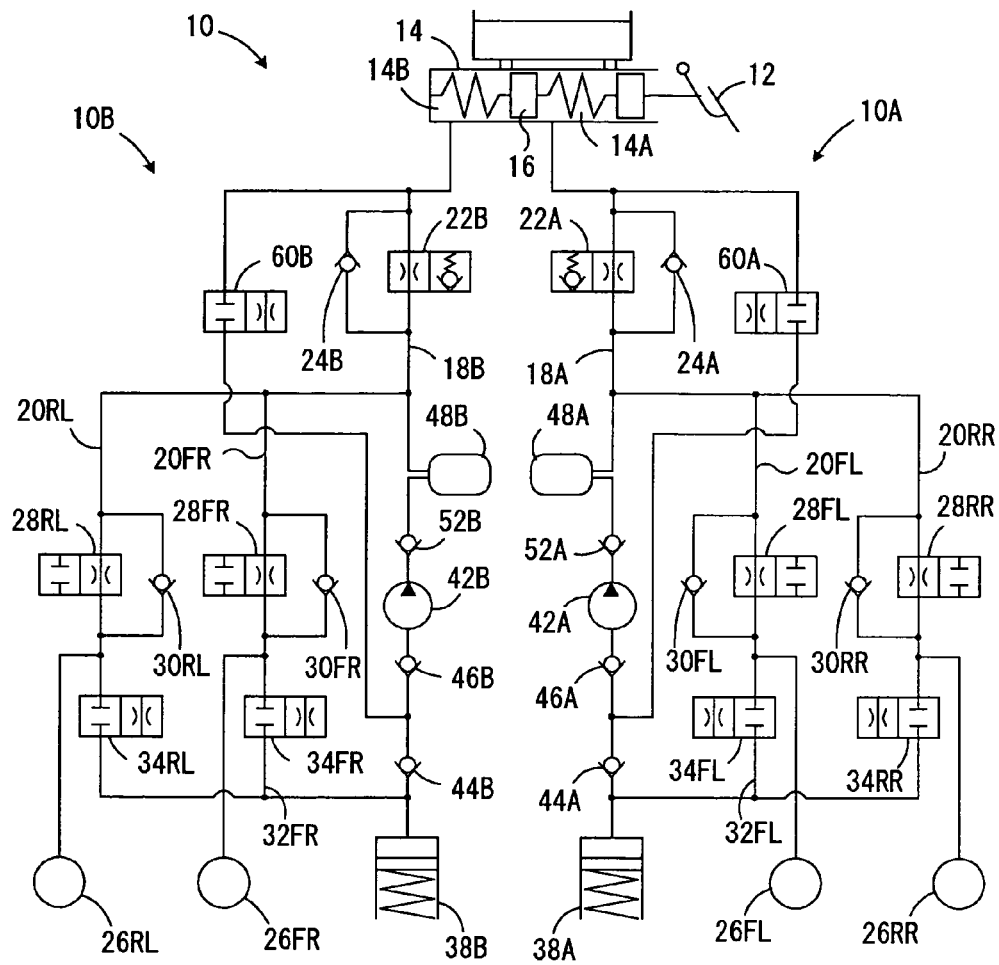
FIG. 1A is a schematic diagram of a hydraulic circuit in a braking control device for a four-wheeled vehicle of a preferred embodiment according to the present invention.
Figure 1B:
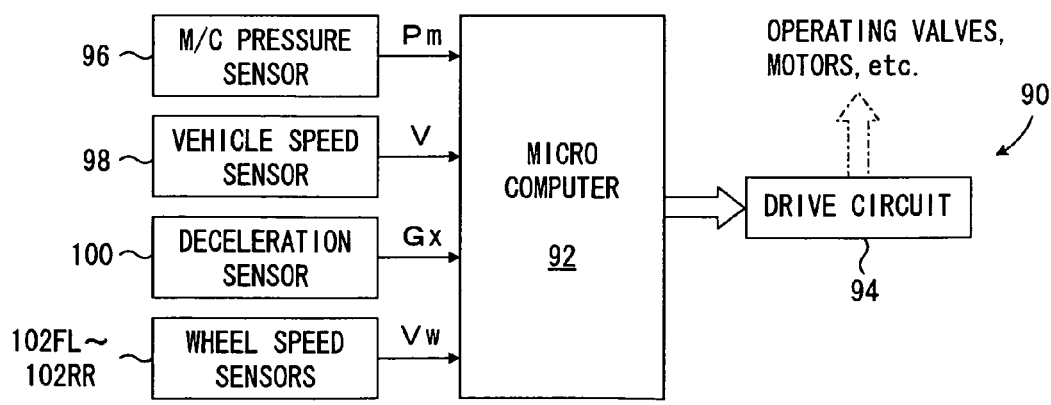
FIG. 1B is a schematic diagram of an electronic controller in a braking control device for operating the components in the hydraulic circuit shown in FIG. 1A.

FIG. 1 illustrates a schematic diagram of a braking system implementing an embodiment of a control device for controlling braking force for a vehicle, enabling BFD control according to the present invention, which braking system consists of a hydraulic circuit 10 (FIG. 1A), transmitting a pressure in a master cylinder 14 (master cylinder pressure) to wheel cylinders 26i (i=FL, FR, RL, RR=front-left, front-right, rear-left and rear-right wheels, respectively) in braking force generating apparatuses provided for the respective wheels (not shown), and an electronic controller 90 (FIG. 1B) controlling brake fluid flows in the hydraulic circuit by operating solenoid valves and other components therein.

Referring to FIG. 1A, the illustrated hydraulic circuit 10 are of X dual circuit type, having two circuits, the one 10A for a pair of front left and right wheel cylinders 26FL, 26RR and the other 10B for a pair of rear left and right wheel cylinders 26FR, 26RL. It should be noted that the two circuits may have the same piping structure, otherwise noted (In an actual braking system, these may be different from each other, of course).

As usual, a braking action of a driver of the vehicle, e.g. by depressing a brake pedal 12, pressurizes brake fluid in the master cylinder 14, compartmentalized into master cylinder chambers 14A and 14B with a free piston 16 movably supported with springs. To each chamber 14A, B connected is a common line 18A, B of the corresponding circuit 10A, B, respectively, leading to two branches 20i connected to the respective wheel cylinders 26i. In each branch 20i, there is provided a two-state, normally opened, solenoid valve 28i, selectively allowing brake fluid from the common line 18A, B (i.e. from the master cylinder 14) to flow into the respective wheel cylinder 26i, and thereby the wheel cylinder 26i will be selectively pressurized or held at a pressure by opening or closing the corresponding valve 28i. In order to avoid excessive pressurization of each wheel cylinder, a check valve 30i, allowing only flow from the wheel cylinder 26i to the common line 18A, B, is provided in parallel to the solenoid valve 28i. The branches 20i are also connected with buffer reservoirs 38A, B, provided with the respective circuit 10A, B, via two-state, normally closed, solenoid valves 34i as shown, so that the pressure in each of the wheel cylinders can be selectively released by opening the corresponding valve 34i.

Each circuit 10A, B further comprises a normally opened, linear pressure regulation valve 22A, B in the corresponding common line 18A, B; a motor-driven pump 42A, B with a damper 48A, B, positioned between the reservoir 38A, B and the common line 18A, B; and a normally closed, solenoid valve 60A, B selectively fluidly communicating the master cylinder chamber 14A, B to the corresponding pump input. These components are provided for regulating the pressure in the common line when braking pressure in a wheel cylinder 26i is to be increased beyond master cylinder pressure.

In detail, when the linear pressure regulation valve 22A, B and valve 60A, B are dosed and opened, respectively, the master cylinder pressure is supplied to the pump input. Then, the pump 42A, B, when operated, pumps up brake fluid from the reservoir 38A, B and the master cylinder into the common line 18A, B. As described below in more detail, the linear pressure regulating valve 22A, B, when switched into a closed position, allows flow from the common line to the master cylinder only when the pressure in the common line exceeds a pressure determined by controlling the energization current supplied to solenoid coils in accordance with the controller 90. Further, since the master cylinder pressure is supplied through the valve 60A, B to the pump input, the pressure in the common line will not be lowered below the master cylinder pressure. A check valve 24A, B, connected in parallel with the regulating valve 22 A, B, also prevents the common line pressure from lowering below the master cylinder pressure. Accordingly, the pressure in the common line 18A, B is regulated at a pressure beyond the master cylinder pressure under the control of the controller 90.

Check valves 44A, B, 46A, B and 52A, B may be provided for avoiding any flow in undesirable directions. The damper 48A, B may be provided for smoothing out the pump output.

Referring to FIG. 1B, Electronic controller 90 incorporates a microcomputer 92, which may be of an ordinary type including a central processor unit, a read only memory, a random access memory, input and output port means and a common bus interconnecting these elements (not shown). The microcomputer 92 receives a signal of master cylinder pressure Pm, from a master cylinder pressure sensor 96 provided near the master cylinder 14; a signal of a vehicle speed V from a vehicle speed sensor 98; a signal of a vehicle longitudinal deceleration Gx from a longitudinal deceleration sensor 100; signals of wheel speeds Vwi from the respective wheel speed sensors 102i; calculates target braking pressures Pti (i=FL, FR, RL, RR) and operates the valves, pumps, etc. through a driving device 94 in accordance with a control flow and related data, memorized in the microcomputer, as explained about later. The sign of the deceleration signal Gx is defined as positive in the direction decreasing the vehicle speed.

Figure 2:
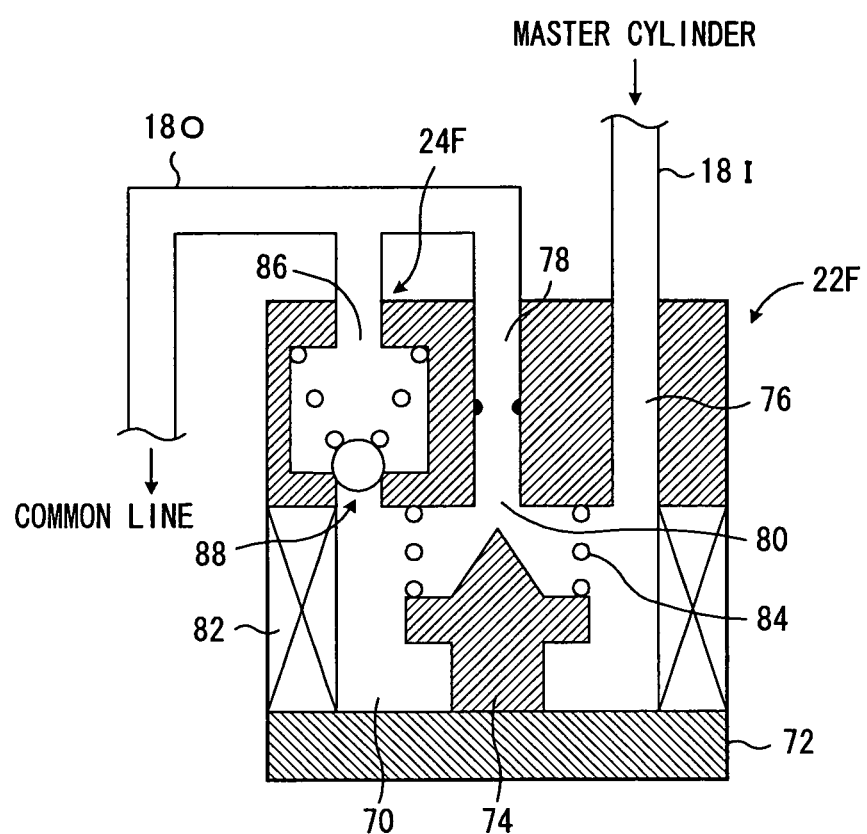
FIG. 2 is a schematic, sectional view of a pressure regulating valve employed in the hydraulic circuit shown in FIG. 1A.

FIG. 2 shows a schematic diagram of the linear pressure regulating valve 22A(13), incorporating the check valve 24A (B), provided in each common line 18F, R. As shown, the valve comprises a housing 72 receiving an inlet line 18I connected to the master cylinder chamber 14A(B) and an outlet line 18O leading to the common line 18A(B) for the wheel cylinders 26i; a valve chamber 70; a valve body 74 movable up and down in the valve chamber; and solenoid coils 82. The inlet and outlet lines 18I, 18O are opened to the valve chamber 70 through internal lines 76 and 78, respectively.

In the absence of enegaization of the solenoids 82, the valve body 74 is biased downwardly by a compression spring 84, opening an aperture 80 of the internal line 78 for the outlet line 18O and rendering the common line 18A(B) exposed to the master cylinder pressure. When the solenoids is energized, the valve body is moved upwardly against the spring force, closing the aperture 80 and shutting out the fluid communication between the master cylinder and common line. Since, however, the common line is pressurized with the pump 42A(B), the valve body opens the aperture when the sum of the spring force and the pressure in the common line exceeds the sum of the master cylinder pressure and the electromagnetic force moving the valve body upwardly, allowing the flow from the common line to the valve chamber 70. Accordingly, the pressure in the common line 18A(B) will be regulated by adjusting the energization current supplied to the solenoids. In this connection, for ensuring this pressure regulation in the common line, the check valve 24A(B), consisting of a valve ball biased by a spring for closing an aperture 88 opened to the valve chamber 70, is provided in parallel, allowing only the flow from the valve chamber to the common line in order to maintain the common line pressure at or above the master cylinder pressure. (The pressure regulation would not work if the common line pressure is lowered below the master cylinder pressure, because the flow from the valve chamber 70 to the common line 18O would occur upon opening the aperture 80.) In operation, the valves in the hydraulic circuit 10 are positioned as shown in FIG. 1A under normal condition (in the absence of BFD). Thus, the master cylinder pressure is directly reflected in the whole wheel cylinders 26i: The wheel cylinder pressures Pwi are substantially equal to the master cylinder pressure Pm.

However, when it is judged that BFD control is to be started in response to the depression of the brake pedal, etc. (the conditions requiring BFD are explained below in more detail), the valve 28RL, RR in the circuit 10R are closed, isolating the rear wheel cylinders 26RL, RR and holding them at a holding pressure Pc to be determined in a manner as described below. In addition to the closing the valve 28RL, RR, the regulating valves 22A, B and the valves 60A, B are closed and opened, respectively, and the pumps 42A, B are operated. Then, the pressures in the common line 18A, B and wheel cylinders 26FL, FR are varied for generating braking force on the respective front wheels by adjusting the energization current fed to the solenoids in the valves 22A, B with the controller 90.

Consequently, in this embodiment of the present invention, during execution of BFD control, the rear wheel cylinders are held at the holding pressure in order to prevent the locking of the rear wheels prior to the front wheels: the increase in the braking action by the driver after starting of BFD control is reflected only in the pressure in the front wheel cylinders. Under this condition, the front wheel braking pressure is increased beyond the master cylinder pressure, compensating for the shortage in the braking force due to the restriction of the pressure increase in the rear wheel cylinder.

Figure 3A:
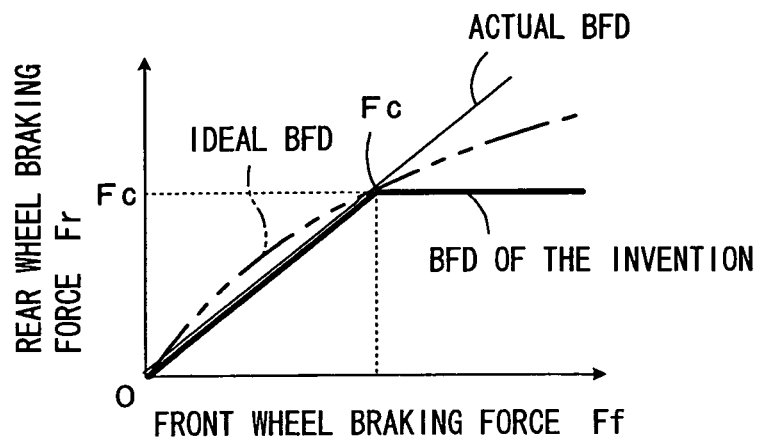
FIG. 3A shows a phase diagram of condition of braking force distribution among front and rear wheels, showing an ideal braking force distribution line (two-dotted line), an actual braking force distribution line (thin solid line) in a case that the same braking pressure is applied to the front and rear wheels; and a braking force distribution line obtained in a preferred embodiment of the present invention.
Figure 3B:
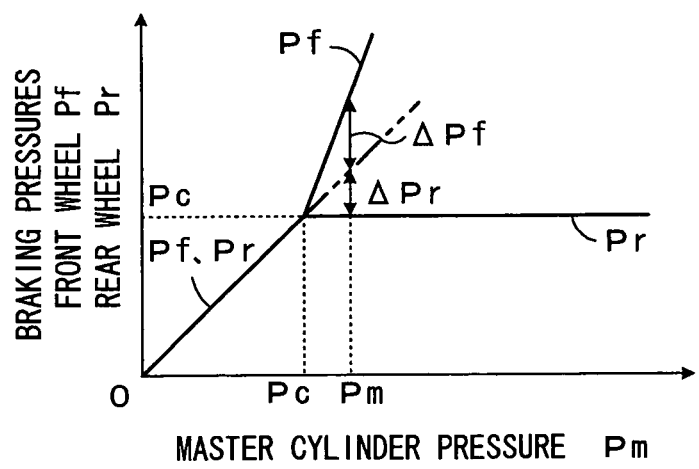
FIG. 3B shows graphs of the relations between braking pressures Pf, Pr in front and rear wheels and master cylinder pressure Pm under braking force distribution control of a preferred embodiment of the present invention.

With reference to FIGS. 3A and 3B, a control strategy in the embodiment of the present invention will be explained below.

FIG. 3A shows a phase diagram of a condition of braking force distribution among front and rear wheels, where the theoretically obtained ideal BFD line, well known in the art, (two-dot dashed line) and an actual BFD line (thin solid line) are drawn.

The ideal BFD line indicates a condition in which braking force is so distributed among the front and rear wheels that the front and rear wheels are simultaneously locked (Detailed of this line is described elsewhere). Thus, if a condition of braking force distribution is above this line, the possibility that a rear wheel will be locked prior to front wheels will be high.

The actual BFD line indicates condition in which the same pressure is applied to the wheel cylinders when a vehicle runs at a certain speed. As shown, the actual BFD line linearly increases below the ideal line and intersects with the ideal line at a certain point Fc. Thus, further increase in the rear wheel braking force along the actual line would induce the locking of the rear wheel prior to the front wheels. In order to avoid this, in the embodiment, the rear wheel braking force should be held at the force of the intersecting point Fc, i.e. further increase of the rear wheel braking force is restricted. The force Fc corresponds to a holding pressure Pc. As seen from FIG. 3A, further increase of the total braking force under the condition that the rear wheel braking force would exceed Fc, the master cylinder pressure Pm exceeds the holding pressre (Pm>Pc) is reflected in the front wheel braking force or pressure as shown in the thick line.

In this connection, it has been revealed practically that, when the vehicle speed increases, the ratio of the braking effectiveness of a front wheel to that of a rear wheel is reduced: the decrement of the braking force on a rear wheel due to the increase of the vehicle speed is smaller than that on the front wheel if the same braking pressure is applied to those wheel cylinders. Accordingly, the actual line is brought closer to the rear wheel axis (ordinate) and the intersecting point Fc is shifted toward 0 along the ideal BFD line, resulting in that the holding force or pressure Fc, Pc should be decreased with the increase of the vehicle speed.

Further, the ideal BFD line is shifted upwardly as a vehicle weight increases. In such a case, as seen from the phase of FIG. 3A, it is preferable that the holding pressure is to be increased, thereby allowing the generation of larger braking force on rear wheels without exerting excessive load on the front wheels. In order to take into account the effect of the vehicle weight on the braking force distribution, the holding pressure determined based upon the vehicle speed is preferably modified to increase as the deceleration decreases. (Supposing a certain braking force is exerted on a vehicle, the deceleration is decreased as the vehicle weight (mass) increases: Braking force=Mass×Deceleration.)

Figure 4A:
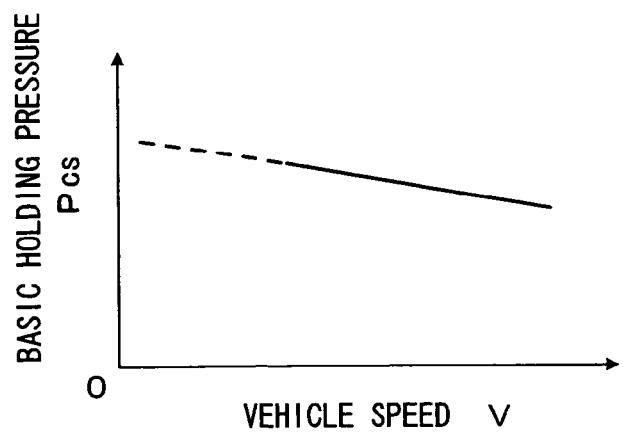
FIG. 4A shows a map of basic holding pressure for rear wheels Pcs vs. a vehicle speed V, used in calculation of the basic holding pressure.

Practically, in the present embodiment, the holding pressure Pc may be determined as a function of a vehicle speed V and a deceleration Gx by using maps of Basic holding pressure Pcs vs. Vehicle speed V as shown in FIG. 4A and Correction pressure $\Delta Pc$ vs. Deceleration Gx as shown in 4B as follows:

$$Pc=Pcs+\Delta Pc. \tag{1}$$

Figure 4B:
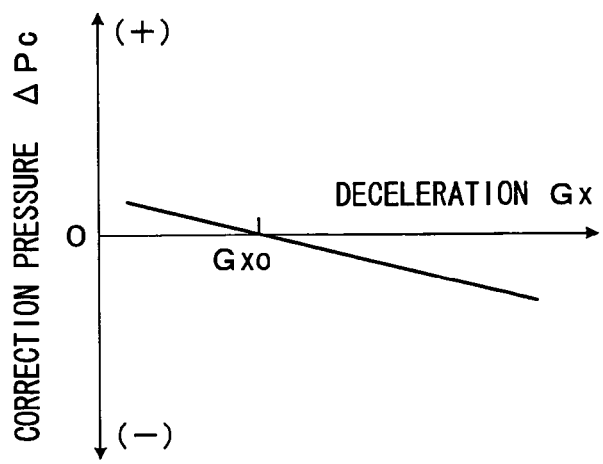
FIG. 4B shows a map of a correction pressure ΔPc vs. deceleration Gx, used in calculation of the correction pressure.

These maps may be obtained experimentally or theoretically and memorized in the microcomputer 92. In FIG. 4B, Gxo, where $\Delta Pc=0$, may be a standard deceleration generated on a standard weighted vehicle during braking.

In accordance with the holding of the rear wheel braking pressure, the total braking force to be exerted for the vehicle will be short, while the locking of the rear wheel prior to the front wheel is prevented. Thus, in the embodiment of the present invention, the front wheel braking force is incremented for compensating for the shortage of the rear wheel braking force. With reference to FIG. 3B showing the braking pressures Pf, Pr in the front and rear wheel cylinders supplied with master cylinder Pm, the pressure Pf for the front wheels will be incremented by $\Delta Pf$, i.e. $Pf=Pm+\Delta Pf$, while the rear wheel cylinder is held at Pc. The increment $\Delta Pf$ for the front wheels corresponds to the braking force that would be produced with the restricted amount in the rear wheel braking pressure $\Delta Pr$, the difference between Pm and Pr (=Pc).

Practically, the increment $\Delta Pf$ will be determined as a function of the decrement of the rear wheel braking pressure, i.e. the difference between the master cylinder pressure and holding pressure: Pm−Pc, taking into accounts braking performances of the front and rear wheels and the vehicle speed-dependent braking effectiveness of the front wheels for the vehicle body as described in the followings.

Firstly, a braking force increment on the front wheel $\Delta Ff$ is equal to a force decrement on the rear wheel $\Delta Fr$. $\Delta Ff$ and $\Delta Fr$ are given by:

$$\Delta Ff = \Delta Pfo \times (Sf \times Rf \times BEFf)$$

$$\Delta Fr = \Delta Pr \times (Sr \times Rr \times BEFr)$$

where $\Delta Pfo$ is a basic front wheel braking pressure increment (before corrected with the braking effectiveness dependent upon a vehicle speed); Sf, Sr, sectional areas of the front and rear wheel cylinders; Rf, Rr, braking effective radii for the front and rear wheels; and BEFf, BEFr, braking effectiveness factors for the front and rear wheels. The sectional areas and braking effective radii are determined by specifications of the front and rear wheel braking force generating apparatus, and the braking effectiveness factors are experimentally obtained.

Since $\Delta Ff = \Delta Fr$ is to be established, the basic front wheel braking pressure increment is given by:

$$\Delta Pfo = \Delta Pr \times (Sr \times Rr \times BEFr) / (Sf \times Rf \times BEFf) \quad (2)$$
$$= (Pm - Pc) \times (Sr \times Rr \times BEFr) / (Sf \times Rf \times BEFf).$$

Figure 5:
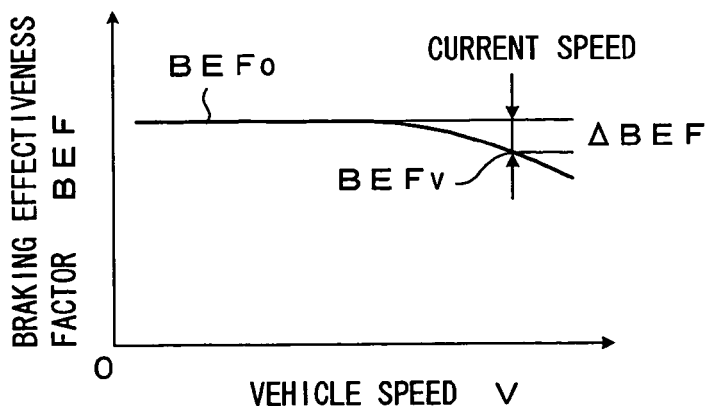
FIG. 5 shows a map of braking effectiveness factor of a front wheel on a vehicle vs. a vehicle speed, used in correction of the braking pressure increment for a front wheel.

Secondly, it has been experimentally revealed that the braking effectiveness factor of the front wheel pressure for a vehicle body, BEF, is decreased dependent upon a vehicle speed as shown in a map of FIG. 5. Thus, the basic front wheel pressure increment may be modified as follows:

$$\Delta Pf = \Delta Pfo \times (1 + \Delta BEF/BEFo) \quad (3)$$

where BEFo is a reference braking effectiveness, measured at a predetermined reference speed; and $\Delta BEF$, a deviation of the effectiveness at current speed from the reference. The calculations of expressions (2) and (3) are executed in real time with the microcomputer 92 in which all the required factors, constants and the map can be memorized to be used.

As is not shown here, a braking effectiveness of a rear wheel on the vehicle may be modified similarly with respect to its dependency upon a vehicle speed.

As noted, the front wheel braking pressure is adjusted to Pm+$\Delta Pf$ through controlling the energization current fed to the pressure regulating valve 22 and operating the pump 42.

Typically, BFD control for holding the rear wheels at the holding pressure Pc may be started when the master cylinder pressure Pm reaches to the holding pressure Pc on the assumption that the rear wheel braking pressure Pr is nearly equal to the master cylinder pressure in absence of BFD control and any other control for modifying braking pressure.

Further, the BFD control may be started in response to other conditions, for instance, when the deceleration Gx exceeds a reference deceleration Gxs (a positive constant) for starting BFD control; when the difference between an average wheel speed of the front left and right wheels and that of the rear left and right wheels ($\Delta Vw = \frac{1}{2}(VwFL+VwFR-VwRL-VwRR)$) exceeds a reference speed Vws (a positive constant) for starting BFD control; and when both the conditions of the deceleration and average wheel speed are established. When BFD is stated to hold the rear wheel braking pressure in response to the conditions other than the master cylinder pressure, the pressure increment for the front wheels will be calculated by regarding the master cylinder pressure Pm at the holding as the holding pressure Pc irrespective of the maps of FIGS. 4A and 4B.

Preferably, BFD control lasts as long as Pm, Gx, or $\Delta Vw$ exceeds Pc, Gxs or $\Delta Vw$. In practical, the BFD control may be terminated when either or all of Pm, Gx and $\Delta Vw$ fall below the respective reference values, Pme (a positive constant); Gxe (a positive constant); and Vwe (a positive constant). The reference values, Pme, Gxe, Vwe are preferably rather smaller than the corresponding Pc, Gxs, Vws, in order to avoid hunting in the control.

It should be realized that the conditions of the starting and ending of BFD control may be theoretically and/or experimentally determined in various manners known in the art.

When braking force on either of the wheels becomes high and renders the wheel being locked, ABS control will be executed even during BFD control. Because of BFD biased to the front wheels, a front wheel is liable to be locked so that ABS control will be normally executed for either of the front wheels. Since ABS control restricts the braking force involved therewith, thereby decreasing the total force on the vehicle, the braking pressure of the rear wheel cylinders is increased by opening the valves 28RL, RR so as to compensate for the shortage of the front wheel braking force.

Under the circumstance, it is expected that the braking force on the other front wheel is relatively high and, as described above, the pressurization of the common lines 18A, B to provide the pressure increment for the front wheel cylinders would induce excessive pressurization of rear wheel cylinders upon opening the corresponding valves 28RL, RR, which would cause deterioration of the vehicle stability and braking controllability.

Accordingly, in the present embodiment, when ABS control for either of wheels is started, the increment for the front wheel braking pressure $\Delta Pf$ will be reduced. When ABS control is executed, the increment $\Delta Pf$ is anticipated to be relatively high (so, a front wheel is being locked). Thus, instantaneous cancellation of the increment would induce an abrupt and large variation of the braking force on the front wheels, which could cause disturbance of the vehicle attitude, and therefore the process of reducing the increment is gradually or smoothly advanced. For smoothly reducing the increment, preferably, the braking action by the driver is not reflected in of the increment.

Practically, after ABS control is started during BFD execution, the increment of the front wheel braking pressure $\Delta Pf$ is reduced by $\Delta P$ in repetitive processes as described below in conjunction with a flow chart:

$$\Delta Pf = \Delta Pff - \Delta P$$

where $\Delta Pff$ is the increment of the front wheels braking pressure in the previous cycle. This reducing process lasts in the presence of ABS control until $\Delta Pf = 0$.

Figure 6:
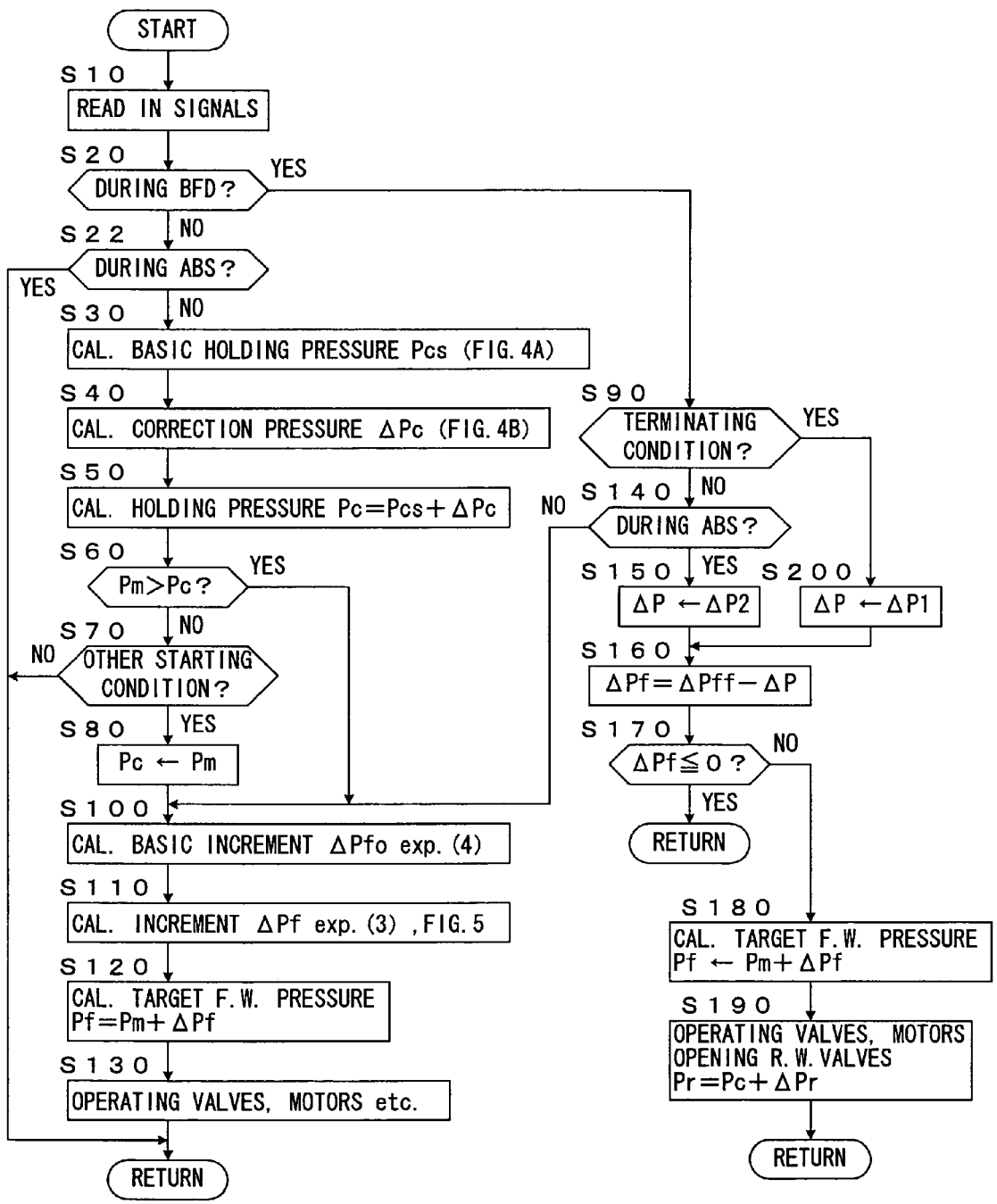
FIG. 6 is a example of a flowchart executed in a braking force distribution control device of a preferred embodiment of the present invention.

In the followings, referring to FIG. 6, the operation of the braking force distribution control device, explained above with reference to FIGS. 1A and 1B, will be described. The control according to a control routine shown in FIG. 6 is started by a closure of an ignition switch (not shown in FIG. 1) and cyclically repeated at a cycle time such as several milliseconds during the operation of the vehicle. In this routine, basically, before execution of BFD, the holding pressure Pc is calculated based upon current vehicle speed, etc. in every cycle. However, once the BFD is started, the rear wheel braking pressure is held and the variations of braking action by a driver and demand of BAC, if any, are reflected only in the front wheel braking pressure. Thus, in this case, steps of calculation of the holding pressure and judgment of the starting of BFD are bypassed until any condition for terminating the BFD is established. When ABS control for either of wheels is executed, the BFD control is not started.

Firstly, in step 10, the signals shown in FIG. 1B and the aforementioned parameters required in the following steps are read in. The information of presence of currently executed ABS control is also acquired.

In step 20, whether or not the BFD control has been already executed is judged. If BFD is not executed, the presence of currently executed ABS control is judged (step 22). If any of wheels is under ABS control, the process is re-started. Until ABS control is terminated, BFD control is not executed. If no ABS control is executed, a holding pressure Pc is determined in steps 30-50 based upon a vehicle speed V and a (the) deceleration Gx by using maps in FIGS. 4A and 4B.

Next, in steps 60 and 70, it is detected if BFD is to be executed. when the master cylinder Pm, regarded as a current rear wheel braking pressure, exceeds the holding pressure Pc(step 60) or when the other aforementioned condition for starting BFD is established, the judgment of starting of BFD is done and steps 100-120 for calculating the target front wheel braking pressure will be executed by using the aforementioned equations (2)-(3) together with the map in FIG. 5. If the judgment of the staring of BFD is done in Step 70, the holding pressure Pc is re-defined to be the value regarded as the current rear wheel braking pressure: Pc←Pm+ΔPbar, Pc←Pm(or Pwa), Pc←Pm.

Then, in accordance with the above result, the valves in the hydraulic circuit are operated in steps 130. Namely, the valves for isolating the rear wheel cylinders 28RL, RR are closed while the pressure regulating valves 22A, B and valves 60A, B are closed and opened, respectively, and the pumps 42A, B are started. Then, in order to control the front wheel braking pressure, the energization current corresponding to Pf is fed to the regulating valves 22A, B.

If either of conditions for starting BFD is not established in steps 60 and 70, the routine returns to Start without executing steps 100-130: without BFD control is not executed.

When BFD has been already executed in the judgment in Step 20, Step 90 is executed directly, in which it is detected if BFD is to be terminated by checking any establishment of the aforementioned conditions for terminating BFD. If none of these conditions is established, then, step 140 for judging if ABS control for any wheel is executed. If no ABS control is executed, steps 100-130 is executed while bypassing steps 20-80. In step 130, the valves in the hydraulic circuit are operated so as to control only the front wheel braking pressure because the valves for holding the rear wheel cylinders has been closed in the previous cycle.

On the other hand, if ABS control is executed for either of the wheels, the executed BFD should be ceased as described above. In view of the vehicle stability, however, it is not preferable to nullify the increment ΔPf for the front wheel at once. Thus, the increment ΔPf is gradually reduced by repetitively executing steps 150-190. Furthermore, it is preferable that the rear wheel braking pressure is gradually incremented since the braking force on a front wheel involved with ABS control is restricted.

More specifically, the following processes are executed in every cycle until the increment for the front wheels is nullified: After ABS control execution is detected, ΔP is set to ΔP2 (step 150) and ΔPf is set to ΔPff−ΔP (step 160). ΔPff is ΔPf in the previous cycle. ΔP2 may be a positive constant (ΔP2 may be a value determined with the opening time of the release valves 34FL, FR.) Then, if still ΔPf>0 (step 170), the front wheel braking pressure is controlled using the decremented increment ΔPf. Further, in step 190, the rear wheel braking pressure is incremented by ΔPc: Pr=Pc+ΔPr, by operating components in the hydraulic circuit, e.g. by opening the valves 28RL, RR, preferably intermittently. ΔPr may be controlled by the opening time of the valves 28RL, RR.

Consequently, through the repetitive execution of steps 150-190 until ΔPf≤0, the front wheel braking pressure increment is gradually decreased while the rear wheel is increased.

When ΔPf≤0 in step 170, the BFD biased to the front wheel has already disappeared and the process of the flowchart is restarted. If ABS control has been terminated during the reduction of the increment for the front wheels (step 140), steps 100-130 for normal BFD control are executed.

When any condition for terminating the BFD control is detected in step 90, normally, ΔPf is nearly equal to zero because, expectedly, the master cylinder pressure is almost reduced to the holding pressure Pc (see exp. (2)). However, if the terminating condition is detected due to any abnormal reason such as a failure of sensors, it is possible that ΔPf has a significant value: the nullification of ΔPf at once would cause a disturbance of the vehicle's running condition. In order to avoid this, the increment ΔPf is gradually reduced when the terminating condition is detected. In this case, ΔP is set to ΔP1, which is larger than ΔP2 because BFD under abnormal condition should be cancelled as soon as possible. Then, the increment ΔPf is reduced in the following steps until ΔPf≤0 in the same manner as in the case under ABS control. Together with the reduction of the increment for the front wheel, the holding of the rear wheel braking pressure is also to be released. However, there is a possibility that the front wheel braking pressure is still high enough to cause an abrupt variation in the rear wheel braking pressure. Thus, in order to avoid this, preferably, the valves 28RL, RR is opened intermittently.

Although the present invention has been described in detail with respect to preferred embodiments thereof, it will be apparent for those skilled in the art that other various modifications are possible with respect to the shown embodiments within the scope of the present invention.

For instance, a braking system implementing the present invention may be of a type in which wheel cylinders for the respective wheels are independently controllable. As long as braking force is controllable beyond the braking force requested by a braking action by a driver, the present invention, in view of its features, is applicable to a braking system of any type.

In the afore-mentioned embodiment, braking force has the identical magnitude in each of pairs of front wheels and rear wheels. However, it should be realized that, depending upon a behavior and/or a turning condition of a vehicle, the left and right wheels in each pair of wheels may be controlled so as to generate different forces.

Further, the present invention is applicable to systems where a wheel cylinder pressure sensor for each wheels is provided.

In addition, in the present embodiment, rear wheel is held at the holding pressure by closing the corresponding valve. The pressure in a rear wheel cylinder (or front wheel cylinder), however, may be controlled for maintaining a holding pressure through operation of the corresponding valves (pulsative or dithering increase or decrease) in lines connected toward a common line and/or a reservoir. In this connection, the holding force and/or holding pressure for the rear wheel may be varied depending upon a vehicle speed and/or deceleration in every cycle of the control routine during BFD control.

It should be noted that values for a holding pressure, Pc, Pcs or ΔPc and an increment for the front wheels ΔPfo, ΔPf may be determined differently without deviating the scope of the present invention. Although it is preferable to take into account vehicle speed- and deceleration-dependencies and other characteristics of these values for achieving a highly accurate and appropriate control, some of those characteristics may be ignored depending upon the required accuracy of the control and/or costs of manufacturing, operating and/or maintaining a device.

The invention claimed is:

1. A device for controlling a braking of a vehicle having front and rear wheels, comprising:
    a braking system generating braking forces on the respective wheels,
    at least one sensor monitoring an operational condition of the vehicle including a detector detecting an amount of a braking action by a driver of the vehicle, and
    a controller that is configured to execute an anti-skid control and that is configured to execute a braking force distribution control in which braking force on the front wheels is increased in comparison with braking force on the rear wheels when an operational condition monitored by a sensor among the at least one sensor satisfies a predetermined condition, wherein:
        the braking force on the front wheels during execution of the braking force distribution control is increased, where a braking force increment on the front wheels is determined based upon an increment of the braking action by the driver detected by the detector; however, when execution of the anti-skid control for either of the front wheels is started during the braking force distribution control, the braking force increment on the front wheels is decreased during the braking force distribution control, and
        the decreasing of the braking force increment on the front wheels is interrupted if the anti-skid control is terminated but the increment does not reach zero.

2. A device of claim 1, wherein the braking force on the rear wheels is increased when the anti-skid control is executed.

3. A device of claim 2, wherein the braking system comprises a hydraulic circuit connected with a master cylinder and a braking force generating apparatus including wheel cylinders provided for the respective wheels, the braking action is reflected in a pressure in the master cylinder, valves selectively allow fluid communication between the master cylinder and the rear wheel cylinders, and the increasing of the rear wheel braking force is executed by opening the valves.

4. A device of claim 3, wherein the opening of the valves is executed intermittently.

5. A device of claim 1, wherein the braking force increment on the front wheels is decreased until the increase reaches to zero.

6. A device of claim 1, wherein the braking system comprises a hydraulic circuit connected with a master cylinder and a braking force generating apparatus including wheel cylinders provided for the respective wheels, the braking action is reflected in a pressure in the master cylinder, and the decreasing of the braking force increment is executed by decreasing braking pressures in the front wheel cylinders.

7. A device of claim 6, wherein the hydraulic circuit comprises at least a common line supplying at least one of the front wheel cylinders and at least one of the rear wheel cylinders, and at least a pressure regulating valve in the common line regulating a pressure in the common line and selectively fluidly connecting the common line to the master cylinder.

8. A device of claim 7, wherein the hydraulic circuit is a cross dual circuit type.

9. A device of claim 7, wherein the hydraulic circuit is a front-rear dual circuit type.

10. A device of claim 7, wherein the hydraulic circuit comprises valves selectively allowing fluid communication between the common line and the rear wheel cylinders, hardware in that increasing of the rear wheel braking force is executed by opening the valves.

11. A device for controlling a braking of a vehicle having front and rear wheels, comprising:
    a braking system generating braking forces on the respective wheels,
    at least one sensor monitoring an operational condition of the vehicle including a detector detecting an amount of a braking action by a driver of the vehicle, and
    a controller that is configured to execute an anti-skid control and that is configured to execute a braking force distribution control in which braking force on the front wheels is increased in comparison with braking force on the rear wheels when an operational condition monitored by a sensor among the at least one sensor satisfies a predetermined condition for starting the braking force distribution control, wherein:
        the braking force on the front wheels is increased during execution of the braking force distribution control, but decreased during execution of the braking force distribution control when execution of the anti-skid control for either of the front wheels is started during the braking force distribution control, and
        a rate of decreasing the front wheels braking force when an operational condition monitored by a sensor among the at least one sensor satisfies a predetermined condition for terminating the braking force distribution control is faster than a rate of decreasing the front wheels braking force when anti-skid control for either of the front wheels is executed.

12. A device of claim 11, wherein the braking force on the front wheels is decreased until the braking force reaches a braking force requested by the braking action by the driver.

13. A device of claim 11, wherein an increase of the braking force on the rear wheels is not allowed during execution of the braking force distribution control but is allowed when anti-skid control for either of the front wheels is executed or when an operational condition monitored by a sensor among the at least one sensor satisfies a predetermined condition for terminating the braking force distribution control.

* * * * *